United States Patent
Kato et al.

(10) Patent No.: US 9,006,662 B2
(45) Date of Patent: Apr. 14, 2015

(54) RADIOLOGICAL IMAGE DETECTION DEVICE

(71) Applicant: FUJIFILM Corporation, Tokyo (JP)

(72) Inventors: Munetaka Kato, Ashigarakami-gun (JP); Shinichiro Sonoda, Ashigarakami-gun (JP); Seiji Yamashita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 80 days.

(21) Appl. No.: 13/887,631

(22) Filed: May 6, 2013

(65) Prior Publication Data

US 2013/0313438 A1     Nov. 28, 2013

(30) Foreign Application Priority Data

May 28, 2012 (JP) ................... 2012-120649

(51) Int. Cl.
*G01T 1/20* (2006.01)
(52) U.S. Cl.
CPC ...................... *G01T 1/2006* (2013.01)
(58) Field of Classification Search
CPC ................................ G01T 1/2006; G01T 1/20
USPC ............... 250/483.1, 361 R, 370.11
See application file for complete search history.

(56) References Cited

U.S. PATENT DOCUMENTS

| | | | |
|---|---|---|---|
| 6,777,690 B2* | 8/2004 | Homme et al. | 250/483.1 |
| 6,919,569 B2* | 7/2005 | Homme et al. | 250/370.11 |
| 6,996,209 B2* | 2/2006 | Marek | 378/98.8 |
| 7,019,301 B2* | 3/2006 | Homme et al. | 250/370.11 |
| 7,034,306 B2* | 4/2006 | Homme et al. | 250/368 |
| 2007/0051896 A1* | 3/2007 | Okada et al. | 250/370.11 |
| 2012/0112075 A1* | 5/2012 | Noda | 250/361 R |

FOREIGN PATENT DOCUMENTS

| | | |
|---|---|---|
| JP | 2006-52982 A | 2/2006 |
| JP | 2007-64953 A | 3/2007 |
| JP | 2008-8741 A | 1/2008 |
| WO | WO 2010/029779 A1 | 3/2010 |

OTHER PUBLICATIONS

Japanese Office Action and English translation thereof, dated Jul. 2, 2014, for Japanese Application No. 2012-120649.

* cited by examiner

*Primary Examiner* — Yara B Green
(74) *Attorney, Agent, or Firm* — Birch, Stewart, Kolasch & Birch, LLP

(57) ABSTRACT

A scintillator includes a plurality of columnar crystals. A surface protection film is made of poly-para-xylyene and covers a surface of the scintillator, and the front ends of the columnar crystals penetrate thereinto. A photoelectric conversion panel includes a glass substrate and an element unit formed on the glass substrate. The element unit includes a plurality of pixels, is disposed opposite to the front ends of the columnar crystals, and detects visible light which is emitted from the front ends and is transmitted through the surface protection film in a light receiving region of each pixel so as to be converted into electric charge. To improve an SN ratio, a penetration amount P of the front end into the surface protection film and an area A of the light receiving region of each pixel are set to satisfy a relationship of $0\,m^{-1} < P/A \leq 1.4 \times 10^3\,m^{-1}$.

17 Claims, 6 Drawing Sheets

RADIOLOGICAL IMAGE DETECTION DEVICE

BACKGROUND OF THE INVENTION

1. Field of the Invention

The present invention relates to a radiological image detection device which detects a radiological image.

2. Description of the Related Art

In recent years, in a medical field, in order to perform an image diagnosis, a radiological image detection device has been used in which radiation (for example, X-rays), which is emitted toward a radiographed part of a patient from a radiation source and is transmitted through the radiographed part, is detected and is converted into electric charge, and image data indicating a radiological image of the radiographed part is generated based on this electric charge. As the radiological image detection device, there are a direct conversion type device which directly converts radiation into electric charge and an indirect conversion type device which temporarily converts radiation into visible light and converts the visible light into electric charge.

The indirect conversion type radiological image detection device includes a scintillator (phosphor layer) which converts radiation into visible light and a photoelectric conversion panel which detects and converts the visible light into electric charge. Cesium iodide (CsI) or gadolinium oxide sulfur (GOS) is used in the scintillator.

CsI has higher manufacturing costs than GOS, but has high conversion efficiency when turning radiation to visible light. CsI also has a columnar crystal structure, has an improved SN ratio of image data due to a light guide effect, and is, thus, used as, a scintillator of a high-end oriented radiological image detection device in particular. However, emission efficiency is low when only CsI is used, and thus an augmenting agent such as thallium (Tl) or sodium (Na) is added to CsI. The columnar crystal structure is a structure in which a plurality of columnar crystals soar on a substrate and air is interposed between the adjacent columnar crystals.

A scintillator with the columnar crystal structure such as CsI has a problem of being deliquescent. For this reason, the scintillator with the columnar crystal structure is covered with a moisture-proof surface protection film such as poly-para-xylyene so as to prevent deliquescence (for example, refer to JP2008-8741A).

In JP2008-8741A, the scintillator with the columnar crystal structure is formed on a substrate through deposition, the substrate and the scintillator are covered with a surface protection film, and front end sides of columnar crystals of the scintillator are opposite a photoelectric conversion panel. In addition, in a radiological image detection device disclosed in JP2008-8741A, the surface protection film partially penetrates between the adjacent columnar crystals on the front end side of the columnar crystal.

JP2008-8741A discloses that, since the refractive index of the surface protection film is closer to the refractive index of the columnar crystal than that of air, the surface protection film is interposed between (gap) the adjacent columnar crystals, thus light is likely to be leaked from columnar crystals to the gap, and thereby a light guide effect is reduced.

SUMMARY OF THE INVENTION

However, it is considered that, since the visible light is diffused and is emitted in a radial shape toward the photoelectric conversion panel from the front end of the columnar crystal, the front end of the columnar crystal penetrates into the surface protection film to an extent, and thus the diffusion of the visible light from the front end is suppressed so as to improve an SN ratio. JP2008-8741A does not disclose the diffusion of the visible light from the front end and only discloses that it is not desirable to interpose the surface protection film between the columnar crystals.

Therefore, an object of the present invention is to provide a radiological image detection device capable of improving an SN ratio.

In order to solve the above-described problems, there is provided a radiological image detection device including a scintillator that has a plurality of columnar crystals and converts radiation into a visible light which is emitted from front ends of the columnar crystals; a surface protection film that covers a surface of the scintillator and into which the front ends of the columnar crystals penetrate; and a photoelectric conversion panel that includes a plurality of pixels, is disposed opposite to the front ends of the columnar crystals, and detects visible light which is emitted from the front ends and is transmitted through the surface protection film in a light receiving region of each pixel so as to be converted into electric charge, in which, when a penetration amount of the front end into the surface protection film is P, and an area of the light receiving region of each pixel is A, a relationship of $0 \text{ m}^{-1} < P/A \leq 1.4 \times 10^3 \text{ m}^{-1}$ is satisfied. In addition, preferably, the penetration amount P and the area A satisfy a relationship of $0.1 \times 10^3 \text{ m}^{-1} \leq P/A \leq 1.0 \times 10^3 \text{ m}^{-1}$.

In addition, the scintillator is preferably made of a halogen compound of alkali metal to which an augmenting agent is added. Particularly, the scintillator is preferably made of cesium iodide in which thallium is added to cesium iodide. Further, the surface protection film is preferably made of poly-para-xylyene.

In addition, preferably, when a refractive index of the surface protection film is $n_1$, and a refractive index of the scintillator is $n_2$, a relationship of $n_2 - 0.3 \leq n_1 \leq n_2 + 0.2$ is satisfied. Further, the refractive index $n_1$ of the surface protection film and the refractive index $n_2$ of the scintillator preferably satisfy a relationship of $n_2 - 0.2 \leq n_1 \leq n_2 + 0.1$.

In addition, the light receiving region of each pixel preferably has a square shape.

In addition, preferably, a sticky layer is formed on a surface of the photoelectric conversion panel, and the scintillator is joined to the photoelectric conversion panel via the sticky layer.

Furthermore, preferably, the radiological image detection device further includes a support substrate that supports the scintillator, and the support substrate is disposed on an opposite side to the photoelectric conversion panel with respect to the scintillator. Preferably, the radiological image detection device further includes a substrate protection film formed on the support substrate, and the scintillator is formed on the substrate protection film through deposition.

In addition, the scintillator preferably includes a non-columnar crystal formed on the substrate protection film and the columnar crystals formed on the non-columnar crystal.

Further, preferably, the support substrate is made of aluminum, and the substrate protection film is made of poly-para-xylyene.

Furthermore, preferably, the radiological image detection device further includes an end portion sealing material that covers side portions of the scintillator, the support substrate, and the sticky layer.

In addition, preferably, the photoelectric conversion panel preferably includes a glass substrate; and an element unit formed on the glass substrate, and the element unit includes a plurality of pixels and is opposite the scintillator.

Each pixel preferably includes a photodiode that absorbs visible light so as to generate electric charge; a capacitor that accumulates the electric charge generated by the photodiode; and a thin film transistor for outputting the electric charge accumulated in the capacitor to outside.

In addition, the photoelectric conversion panel is preferably disposed further toward an incidence side of the radiation than the photodiode.

According to the radiological image detection device of the present invention, when a penetration amount of the front end into the surface protection film of the columnar crystal of the scintillator is P, and an area of the light receiving region of each pixel is A, a relationship of $0\ m^{-1} < P/A \leq 1.4 \times 10^3\ m^{-1}$ is satisfied, and thereby it is possible to improve an SN ratio.

DESCRIPTION OF THE PREFERRED EMBODIMENTS

Figure 1:
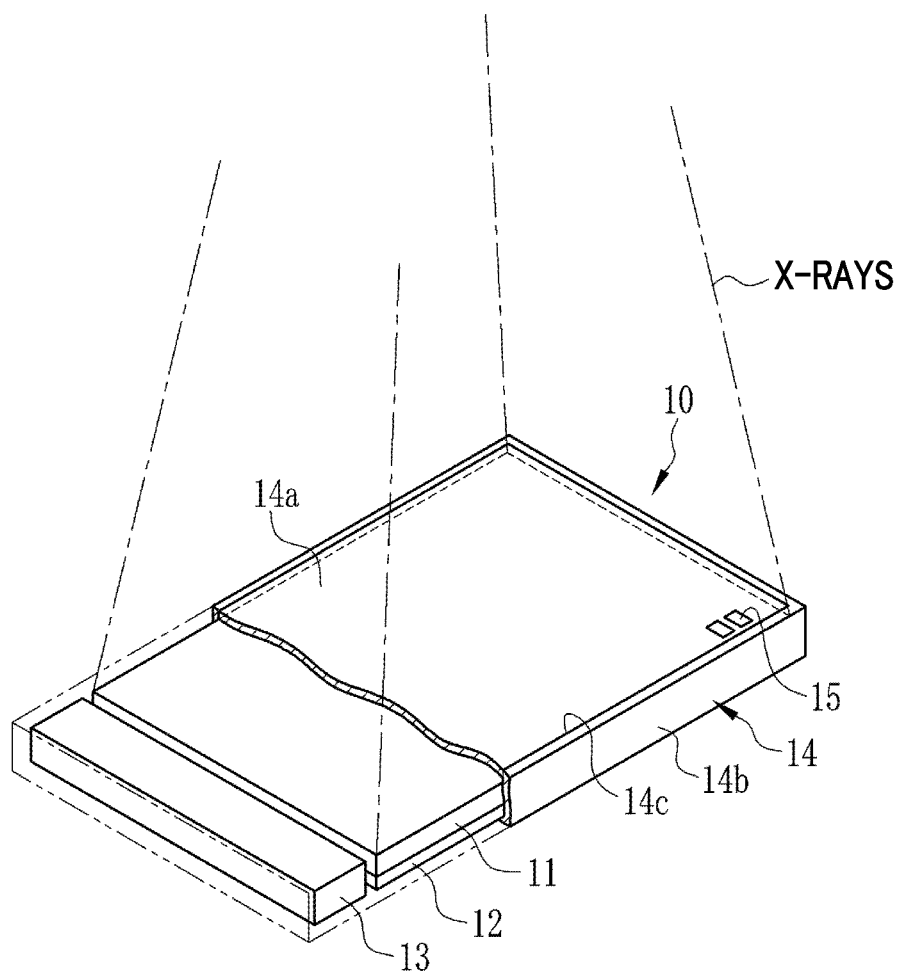
FIG. 1 is a partially broken perspective view of an X-ray image detection device.

In FIG. 1, an X-ray image detection device 10 includes a flat panel detector (FPD) 11, a base 12, an electrical circuit 13, and a casing 14 containing these constituent elements. The casing 14 has a top plate 14a and a flat box-shaped main body 14b.

The top plate 14a seals an opening 14c which is formed on the upper part of the main body 14b. The upper surface of the top plate 14a is an irradiation surface which is irradiated with X-rays emitted from an X-ray generator (not shown) and transmitted through a radiographed part of a subject (patient). Therefore, the top plate 14a is made of carbon or the like with high transmittance of X-rays. The main body 14b is made of an ABS resin or the like.

The X-ray image detection device 10 is portable in the same manner as an X-ray film cassette in the related art, thus may be used instead of the X-ray film cassette, and is called an electronic cassette.

The FPD 11 and the base 12 are disposed in order from the top plate 14a side in the casing 14. The base 12 is fixed to the main body 14b of the casing 14. The FPD 11 is installed on the base 12. The electrical circuit 13 is disposed at one end side in the casing 14 in the transverse direction. The electrical circuit 13 contains a microcomputer or a battery (neither shown).

The top plate 14a is provided with a display unit 15 including a plurality of light emitting diodes (LEDs). The display unit 15 displays an operation mode (for example, a "ready state" or "during transmission of data") of the X-ray image detection device 10 or an operation state such as a remaining battery power of the electrical circuit 13. In addition, the display unit 15 may include a light emitting element other than the LED, or may include a liquid crystal display, an organic EL display, or the like.

Figure 2:
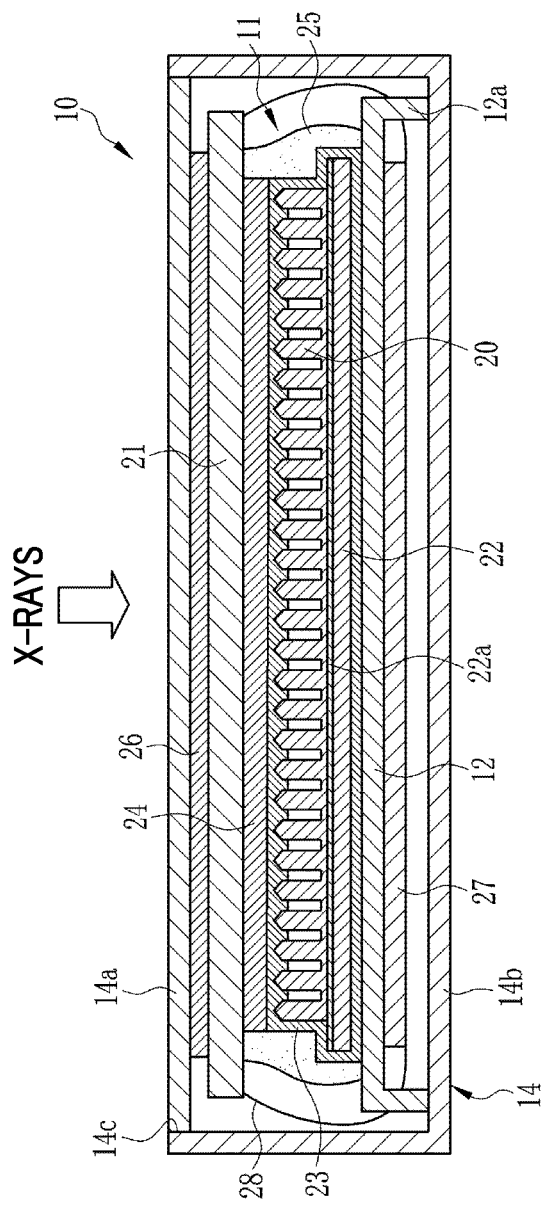
FIG. 2 is a schematic cross-sectional view of the X-ray image detection device.

In FIG. 2, the FPD 11 includes a scintillator 20 and a photoelectric conversion panel 21. The scintillator 20 is formed by depositing CsI:Tl (cesium iodide to which thallium is added) on a support substrate 22, and has a columnar structure. The support substrate 22 is made of, for example, aluminum with the thickness of about 300 μm. A substrate protection film 22a is formed on the surface of the support substrate 22 on which the scintillator 20 is formed. The substrate protection film 22a is made of for example, poly-para-xylyene with the thickness of about 10 μm. As the poly-para-xylyene, more specifically, Parylene C (manufactured by Parlyene Japan Corporation; "Parylene" is the trade name) is used.

A surface protection film 23 is formed on the overall surface exposed to outside of the scintillator 20 and the support substrate 22 for moisture-proofness of the scintillator 20. The surface protection film 23 is made of, for example, poly-para-xylyene with the thickness of about 20 μm. As the poly-para-xylyene, more specifically, Parylene C (manufactured by Parlyene Japan Corporation; "Parylene" is the trade name) is used. The refractive index of the scintillator 20 is 1.81, and the refractive index of the substrate protection film 22a and the surface protection film 23 is 1.64.

The photoelectric conversion panel 21 is disposed on the top plate 14a side of the scintillator 20, and the photoelectric conversion panel 21 and the scintillator 20 are joined to each other via a sticky layer 24. The sticky layer 24 is made of a resin (for example, an acryl resin) which transmits visible light therethrough, and has the thickness of, for example, about 30 μm. In addition, side portions of the scintillator 20, the support substrate 22, and the sticky layer 24 are covered by an end portion sealing material 25. The end portion sealing material 25 is formed using an ultraviolet-ray curable resin. In addition, the photoelectric conversion panel 21 is joined to the top plate 14a via an adhesive layer 26.

The base 12 is fixed to the bottom of the main body 14b with a leg 12a. An electronic board 27 which performs driving and signal processes of the photoelectric conversion panel 21 is installed on a surface of the base 12 opposite to the scintillator 20. The electronic board 27 and the photoelectric conversion panel 21 are electrically connected to each other via a flexible cable 28.

The scintillator 20 absorbs X-rays which are transmitted through a radiographed part, are applied to the top plate 14a, are then transmitted through the top plate 14a, the adhesive layer 26, the photoelectric conversion panel 21, the sticky layer 24, and the surface protection film 23, and are incident thereto, thereby generating visible light. The visible light generated by the scintillator 20 is transmitted through the surface protection film 23 and the sticky layer 24 and is incident to the photoelectric conversion panel 21. The photoelectric conversion panel 21 converts the incident visible light into electric charge, and generates image data indicating a radiological image based on this electric charge.

Figure 3:
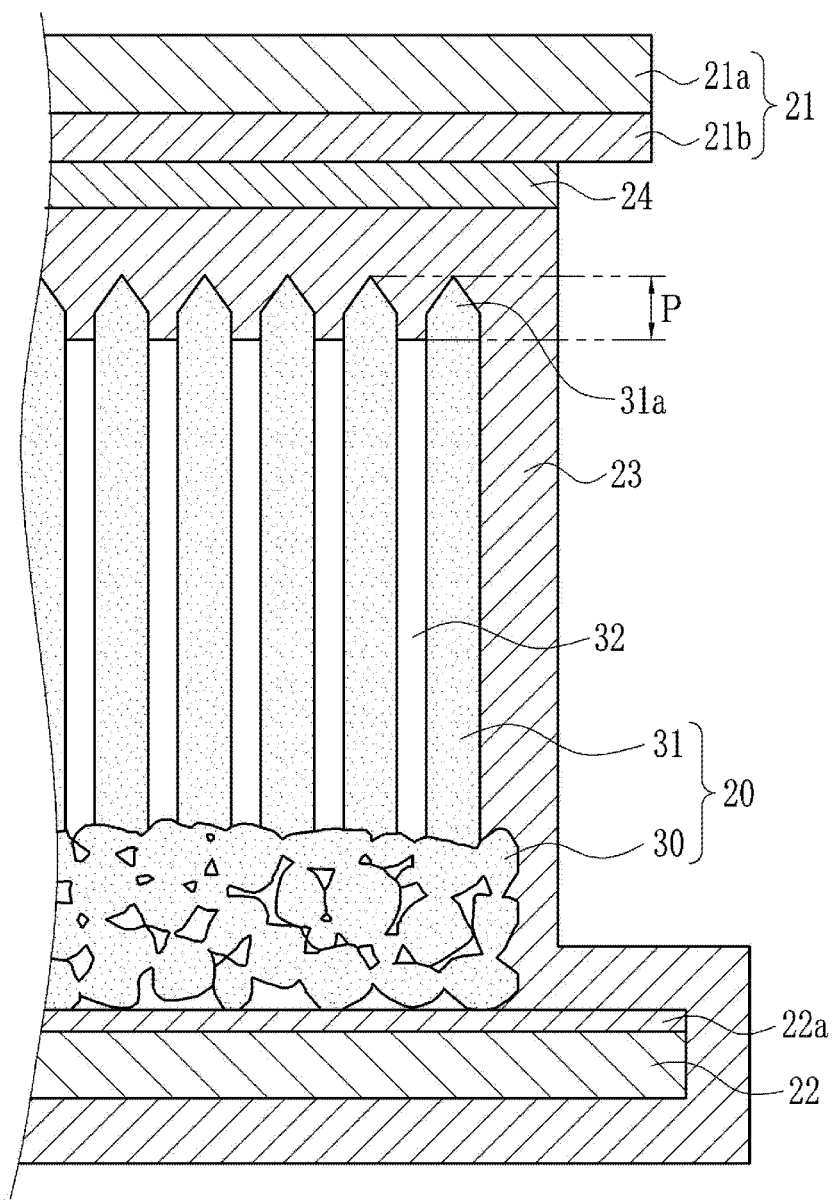
FIG. 3 is a schematic cross-sectional view illustrating a detailed configuration of a scintillator.

In FIG. 3, the scintillator 20 includes a non-columnar crystal 30 and a columnar crystal 31. The non-columnar crystal 30 has a particle shape, and is formed on the entire support substrate 22. The columnar crystal 31 grows on the non-columnar crystal 30 in a crystal form by using the non-columnar crystal 30 as a basis. A plurality of columnar crystals 31 are formed on the non-columnar crystal 30, and are spaced apart from each other via an air layer 32. The diameter of the columnar crystal 31 is substantially uniform (about several μm) in the longitudinal direction.

The X-rays are incident from the photoelectric conversion panel 21 side to the scintillator 20, and thus the generation of visible light in the scintillator 20 mainly occurs on the photoelectric conversion panel 21 side of the columnar crystal 31. The visible light generated by the scintillator 20 propagates toward the photoelectric conversion panel 21 inside the columnar crystal 31 due to a light guide effect of the columnar crystal 31, and is emitted from the front end 31a to the photoelectric conversion panel 21. The front end 31a is approximately conical, and an angle of the top thereof is an acute angle (for example, 40° to 80°).

The visible light generated by the columnar crystal 31 also propagates toward the support substrate 22 side due to the light guide effect. The visible light which propagates through the columnar crystal 31 toward the support substrate 22 side arrives at the non-columnar crystal 30, and is reflected by the non-columnar crystal 30 for the most part and travels toward the photoelectric conversion panel 21 side. For this reason, losses of the visible light generated by the scintillator 20 are small.

The front end 31a of the columnar crystal 31 penetrates into the surface protection film 23. A penetration amount P of the front end 31a into the surface protection film 23 is about 10 μm. A distance from the front end 31a to the photoelectric conversion panel 21 is the same as a thickness obtained by adding the thickness of the surface protection film 23 to the thickness of the sticky layer 24, and is about 50 μm.

The photoelectric conversion panel 21 includes a glass substrate 21a and an element unit 21b formed on the glass substrate 21a. The glass substrate 21a is disposed further toward the X-ray incident side than the photoelectric conversion panel 21, and has the thickness of, for example, 700 μm.

Figure 4:
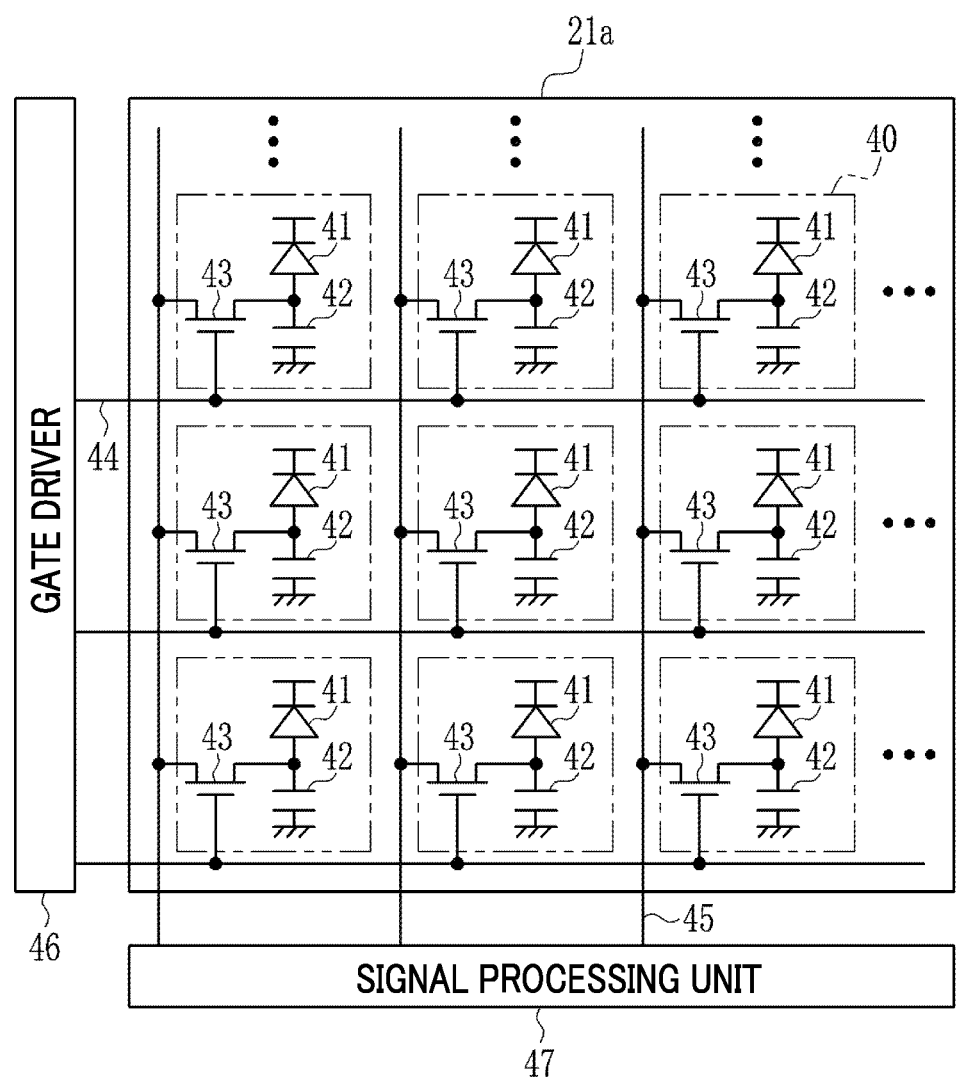
FIG. 4 is a circuit diagram illustrating a configuration of an element unit of a photoelectric conversion panel.

In FIG. 4, the element unit 21b includes a plurality of pixels 40 which are arranged in a two-dimensional matrix. Each of the pixels 40 has a photodiode (PD) 41, a capacitor 42, and a thin film transistor (TFT) 43. The PD 41 is made of amorphous silicon, and generates electric charge by absorbing visible light incident from the scintillator 20. The capacitor 42 accumulates the electric charge generated by the PD 41. The TFT 43 is a switching element for outputting the electric charge accumulated in the capacitor 42 to outside of each pixel 40.

Each pixel 40 is connected to a gate line 44 and a data line 45. The gate line 44 extends in the row direction, and is arranged in plurality in the column direction. The data line 45 extends in the column direction, and is arranged in plurality in the row direction so as to intersect the gate line 44. The gate line 44 is connected to the gate terminal of the TFT 43. The data line 45 is connected to the drain terminal of the TFT 43.

One end of the gate line 44 is connected to a gate driver 46. One end of the data line 45 is connected to a signal processing unit 47. The gate driver 46 and the signal processing unit 47 are provided in the electronic board 27. The gate driver 46 sequentially applies a gate driving signal to each of the gate lines 44 and turns on the TFT 43 of the pixel 40 connected to each gate line 44. When the TFT 43 is turned on, the electric charge accumulated in the capacitor 42 is output to the data line 45.

The signal processing unit 47 has an integrating amplifier (not shown) for each data line 45. The electric charge output to the data line 45 is integrated by the integrating amplifier so as to be converted into a voltage signal. In addition, the signal processing unit 47 includes an A/D converter (not shown), and converts the voltage signal generated by each integrating amplifier into a digital signal so as to generate image data.

Figure 5:
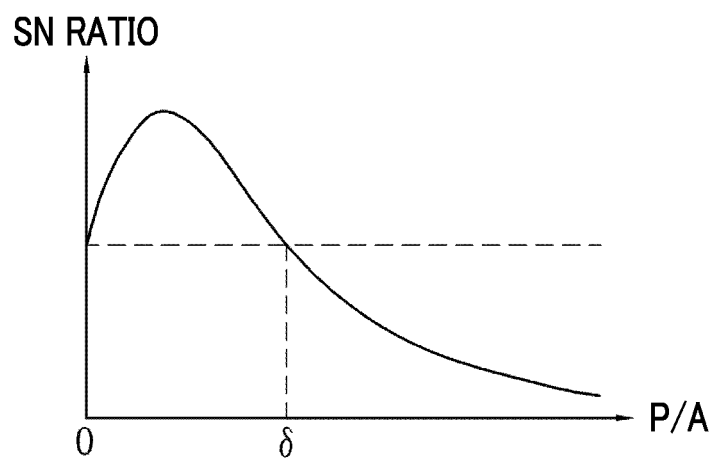
FIG. 5 is a graph illustrating a characteristic of an SN ratio relative to a penetration amount of a front end of a columnar crystal into a surface protection film.

The present applicant has found that an SN ratio of the image data depends on the penetration amount P of the front end 31a of the above-described columnar crystal 31 into the surface protection film 23, and varies as shown in FIG. 5. Specifically, a case where P/A in which the penetration amount P is divided by the light receiving area A of the PD 41 is in a range from 0 to a threshold point δ is further improved in the SN ratio than a case (P/A=0) where the front end 31a does not penetrate into the surface protection film 23. Details thereof will be described later, and the threshold point δ is about $1.4 \times 10^3$ m$^{-1}$.

This SN ratio characteristic is caused by crossover of two factors. As the first factor, if the front end 31a does not penetrate (P=0) into the surface protection film 23, the periphery of the front end 31a is covered by the air layer 32, visible light which propagates through the columnar crystal 31 toward the front end 31a due to the light guide effect is emitted from the front end 31a so as to be diffused, and thus a lot of noise components which do not travel toward the PD 41 opposite to the front end 31a are generated; however, if the front end 31a penetrates into the surface protection film 23, the periphery of the front end 31a is covered by the surface protection film 23 which has a closer refractive index than the air layer 32, and thus noise components which are emitted from the front end 31a so as to be diffused and do not travel toward the PD 41 opposite to the front end 31a are reduced so as to improve the SN ratio. As the second factor, if the penetration amount P is too large, the light guide effect of the columnar crystal 31 is weakened, thus visible light easily propagates toward the adjacent columnar crystals 31, and thereby noise components increase so as to reduce the SN ratio.

Figure 6:
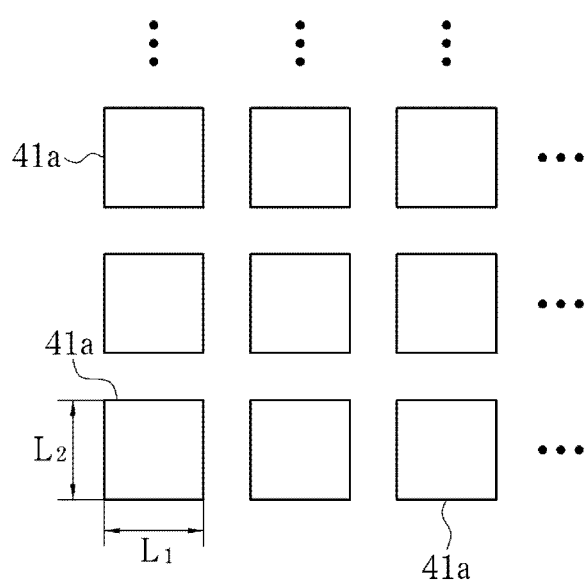
FIG. 6 is a schematic diagram illustrating a shape of a light receiving region of a pixel.

The reason why the value (P/A) obtained by normalizing the penetration amount P with the light receiving area A is used as a parameter of the SN ratio is that, even if the penetration amount P is the same, when the light receiving area A of the PD 41 increases, visible light emitted from the front end 31a of the columnar crystal 31 is easily received by the PD 41, and thus the SN ratio is reduced. In the present embodiment, as shown in FIG. 6, a light receiving region 41a of the PD 41 has a square shape, and a length $L_1$ in the row direction and a length $L_2$ in the column direction are respectively about 150 μm. In this case, the light receiving area A is $L_1 * L_2$. In addition, the light receiving area A is preferably small in order to improve the sharpness of an image.

In the present embodiment, since the light receiving area A is $2.25 \times 10^{-8}$ m$^2$, and the penetration amount P is 10 μm, P/A is $4.44 \times 10^2$ m$^{-1}$. Therefore, in the present embodiment, the SN ratio is improved the most at the position where P/A is substantially peak in the graph shown in FIG. 5.

Figure 7:
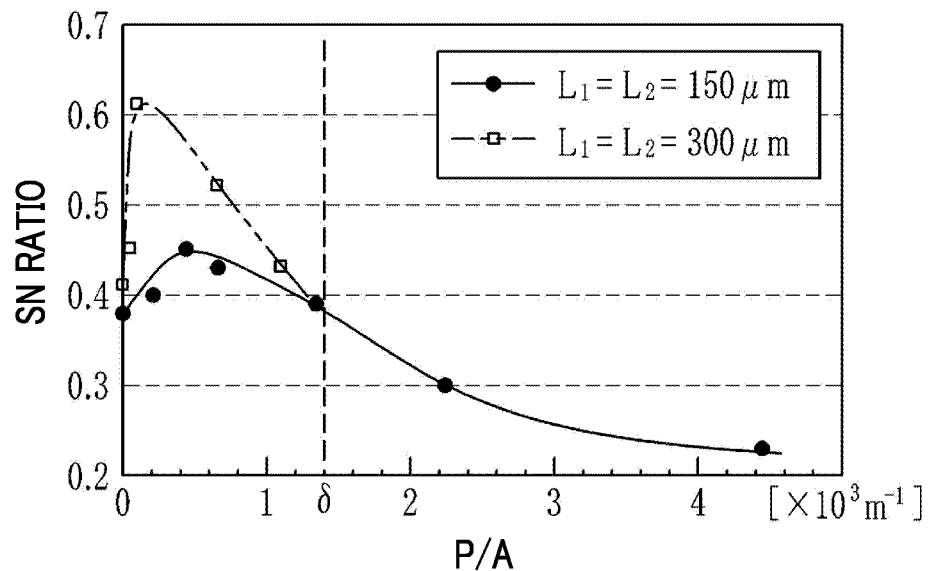
FIG. 7 is a graph illustrating a simulation result of an SN ratio relative to a value obtained by normalizing a penetration amount with a light receiving area.

FIG. 7 is a calculation result of an SN ratio through a simulation when P/A is varied as a parameter. In this simulation, an SN ratio is calculated in a case of $L_1=L_2=150$ μm and in a case of $L_1=L_2=300$ μm while changing the size of the light receiving region 41a. In addition, the refractive index of the scintillator 20 is 1.81, and the refractive index of the surface protection film 23 is 1.64.

The SN ratio indicates a ratio at which visible light emitted from the columnar crystal 31 is received by the light receiving region 41a when a single light receiving region 41a is opposite to a single columnar crystal 31 with the diameter of 6 μm and the length of 650 μm. The periphery other than the light receiving region 41a is assumed as a 100% absorber, and the reflection of the visible light is not taken into consideration.

It can be seen from this simulation result that a value (threshold point δ) of P/A in which the SN ratio is approximately the same as in a case of P=0 is substantially the same as in both the cases of $L_1=L_2=150$ μm and $L_1=L_2=300$ μm, and is about $1.4\times10^3$ m$^{-1}$. If the SN ratio is to be further improved than in a case of P=0, it is necessary for P/A to be set in a range of $0<P/A\leq1.4\times10^3$ m$^{-1}$. In addition, preferably, P/A is set in a range of $0.1\times10^3$ m$^{-1}\leq P/A\leq1.0\times10^3$ m$^{-1}$.

Next, a method of manufacturing the FPD 11 will be described. First, the support substrate 22 made of aluminum is prepared, and poly-para-xylyene is formed using a vapor deposition method on the support substrate 22, thereby forming the substrate protection film 22a with the thickness of about 10 μm. In addition, the support substrate 22 provided with the substrate protection film 22a is placed in a chamber of a deposition device (not shown), and a pressure in the chamber and a substrate temperature are controlled, so as to form the scintillator 20 made of CsI:Tl with the thickness of about 650 μm on the substrate protection film 22a. The columnar crystal 31 is formed in the scintillator 20.

Thereafter, the support substrate 22 in which the scintillator 20 is formed on the substrate protection film 22a is extracted from the deposition device, and poly-para-xylyene is entirely formed using a vapor deposition method, so as to form the surface protection film 23 with the thickness of about 10 μm. At this time, it is possible to adjust the above-described penetration amount P by controlling a forming condition of poly-para-xylyene. For example, the forming condition is controlled such that the penetration amount P is about 10 μm.

Next, the sticky layer 24 is formed on the surface of the photoelectric conversion panel 21 on the element unit 21b side, and the photoelectric conversion panel 21 and the scintillator 20 are attached to each other so that the sticky layer 24 is opposite to the front end 31a of the columnar crystal 31 of the scintillator 20 via the surface protection film 23. In addition, an ultraviolet-ray curable resin is formed so as to cover the side portions of the scintillator 20, the support substrate 22, and the sticky layer 24, and is cured through irradiation with ultraviolet rays, so as to form the end portion sealing material 25. In the above-described way, the FPD 11 is completed.

Figure 8:
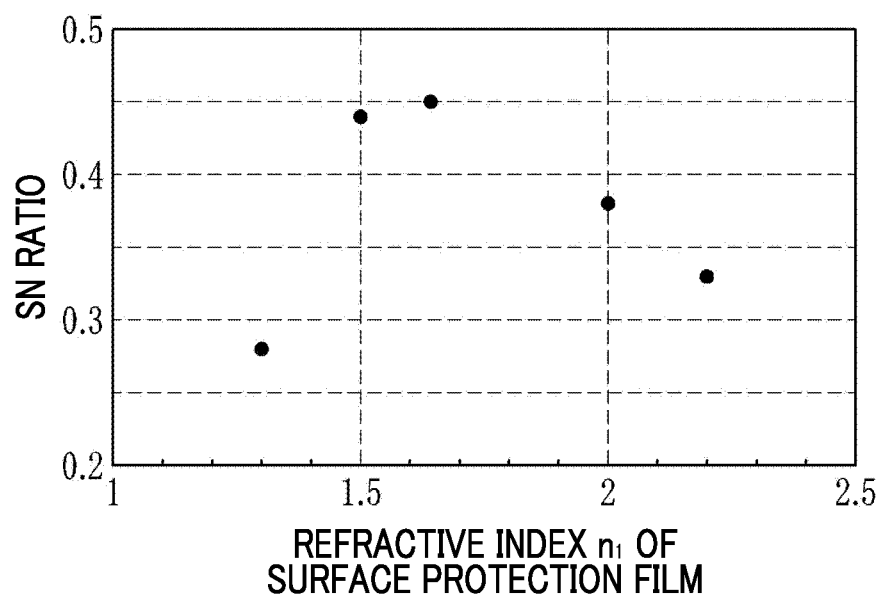
FIG. 8 is a graph illustrating a simulation result of an SN ratio relative to a refractive index of the surface protection film.

FIG. 8 shows a calculation result of an SN ratio through a simulation in a case where a refractive index $n_1$ of the surface protection film 23 is varied at P=10 μm and $L_1=L_2=150$ μm (that is, $P/A=4.44\times10^2$ m$^{-1}$). Here, a refractive index $n_2$ of the scintillator 20 is 1.81. It can be seen from this simulation result that the refractive index $n_1$ of the surface protection film 23 is preferably in a range of $1.5\leq n_1\leq 2.0$ (that is, $n_2-0.3\leq n_1\leq n_2+0.2$), and the SN ratio is improved in this range. In addition, the refractive index $n_1$ of the surface protection film 23 is preferably in a range of $1.6\leq n_1\leq 1.9$ (that is, $n_2-0.2\leq n_1\leq n_2+0.1$).

In addition, in a case where materials other than the poly-para-xylyene are used for the surface protection film 23, the materials preferably have the transmittance of 90% or more for light of the wavelength 550 nm.

Next, an operation of the present embodiment will be described. In order to capture a radiological image by using the X-ray image detection device 10, a radiographer (for example, a radiology technician) inserts the X-ray image detection device 10 between a radiographed part of a subject and the base (not shown) for the top plate 14a being opposite to the radiographed part, and performs positional adjustment.

When the positional adjustment is completed, the radiographer operates a console (not shown) so as to instruct the starting of radiographing. Thereby, X-rays are emitted from an X-ray generator (not shown), and the X-rays transmitted through the radiographed part are applied to the top plate 14a of the X-ray image detection device 10. The X-rays applied to the top plate 14a are transmitted through the top plate 14a, the adhesive layer 26, the photoelectric conversion panel 21, the sticky layer 24, and the surface protection film 23, and are incident to the scintillator 20.

The scintillator 20 absorbs the incident X-rays so as to generate visible light. The generation of the visible light in the scintillator 20 mainly occurs on the top plate 14a side of the columnar crystal 31. The light generated in the columnar crystal 31 propagates through each columnar crystal 31, is emitted from the front end 31a, is transmitted through the surface protection film 23 and the sticky layer 24, and is incident to the element unit 21b of the photoelectric conversion panel 21.

The visible light incident to the element unit 21b is converted into electric charge for each pixel 40 so as to be output to the signal processing unit 47. The signal processing unit 47 converts the electric charge into a voltage signal which is digitalized, thereby generating image data indicating a radiological image. The image data is transferred to the console in a wireless or wired manner, and an image based on the image data is displayed on a monitor (not shown) connected to the console.

Although, in the above-described embodiment, the photoelectric conversion panel 21 and the scintillator 20 are disposed in this order from the incidence side of X-rays, however, in contrast, the scintillator 20 and the photoelectric conversion panel 21 may be disposed in this order from the incidence side of X-rays.

In addition, although, in the above-described embodiment, the light receiving region 41a of each pixel has a square shape ($L_1=L_2$), the light receiving region 41a may be a rectangular shape ($L_1\neq L_2$). In addition, the light receiving region 41a is not limited to the rectangular shape, and may have other polygonal shapes.

Further, although, in the above-described embodiment, the scintillator 20 is made of CsI:Tl, a material of the scintillator 20 may use a material which forms the columnar crystal 31, and a material in which an augmenting agent is added to a halogen compound of alkali metal. As the augmenting agent, one or two may be selected from thallium (Tl), sodium (Na), europium (Eu), and samarium (Sm).

Further, although, in the above-described embodiment, the surface protection film 23 is formed on the scintillator 20 using a vapor deposition method, a sheet-shaped anti-humidity material (for example, a PET sheet) may be joined to the scintillator 20 so as to form the surface protection film 23. In this case, a pressure is controlled when the anti-humidity material is joined to the scintillator 20, and thereby the above-described penetration amount P can be adjusted.

In addition, although, in the above-described embodiment, X-rays are used as radiation, radiation other than X-rays, such as γ rays or α rays may be used. Further, although, in the above-described embodiment, the present invention is applied to an electronic cassette which is a portable radiological image detection device, the present invention is applicable to an upright or supine radiological image detection device, a mammography device, or the like.

What is claimed is:

1. A radiological image detection device comprising:
   a scintillator that has a plurality of columnar crystals and converts radiation into a visible light which is emitted from front ends of the columnar crystals;
   a surface protection film that covers a surface of the scintillator and into which the front ends of the columnar crystals penetrate; and
   a photoelectric conversion panel that includes a plurality of pixels, is disposed opposite to the front ends of the columnar crystals, and detects visible light which is emitted from the front ends and is transmitted through the surface protection film in a light receiving region of each pixel so as to be converted into electric charge, wherein, when a penetration amount of the front end into the surface protection film is P, and an area of the light receiving region of each pixel is A, a relationship of 0 m$^{-1}$<P/A≤1.4×10$^3$ m$^{-1}$ is satisfied.

2. The radiological image detection device according to claim 1, wherein the penetration amount P and the area A satisfy a relationship of 0.1×10$^3$ m$^{-1}$≤P/A≤1.0×10$^3$ m$^{-1}$.

3. The radiological image detection device according to claim 1, wherein the scintillator is made of a halogen compound of alkali metal to which an augmenting agent is added.

4. The radiological image detection device according to claim 3, wherein the scintillator is made of cesium iodide in which thallium is added to cesium iodide.

5. The radiological image detection device according to claim 4, wherein the surface protection film is made of poly-para-xylyene.

6. The radiological image detection device according to claim 1, wherein, when a refractive index of the surface protection film is $n_1$, and a refractive index of the scintillator is $n_2$, a relationship of $n_2-0.3 \leq n_1 \leq n_2+0.2$ is satisfied.

7. The radiological image detection device according to claim 6, wherein the refractive index $n_1$ of the surface protection film and the refractive index $n_2$ of the scintillator satisfy a relationship of $n_2-0.2 \leq n_1 \leq n_2+0.1$.

8. The radiological image detection device according to claim 1, wherein the light receiving region has a square shape.

9. The radiological image detection device according to claim 1, wherein a sticky layer is formed on a surface of the photoelectric conversion panel, and the scintillator is joined to the photoelectric conversion panel via the sticky layer.

10. The radiological image detection device according to claim 9, further comprising:

a support substrate that supports the scintillator, wherein the support substrate is disposed on an opposite side to the photoelectric conversion panel with respect to the scintillator.

11. The radiological image detection device according to claim 10, further comprising:

a substrate protection film formed on the support substrate, wherein the scintillator is formed on the substrate protection film through deposition.

12. The radiological image detection device according to claim 11, wherein the scintillator includes a non-columnar crystal formed on the substrate protection film and the columnar crystals formed on the non-columnar crystal.

13. The radiological image detection device according to claim 12, wherein the support substrate is made of aluminum, and the substrate protection film is made of poly-para-xylyene.

14. The radiological image detection device according to claim 13, further comprising:

an end portion sealing material that covers side portions of the scintillator, the support substrate, and the sticky layer.

15. The radiological image detection device according to claim 1, wherein the photoelectric conversion panel includes a glass substrate; and an element unit formed on the glass substrate, wherein the element unit includes a plurality of pixels and is opposite the scintillator.

16. The radiological image detection device according to claim 15, wherein each pixel includes a photodiode that absorbs visible light so as to generate electric charge;

a capacitor that accumulates the electric charge generated by the photodiode; and a thin film transistor for outputting the electric charge accumulated in the capacitor to outside.

17. The radiological image detection device according to claim 1, wherein the photoelectric conversion panel is disposed further toward an incidence side of the radiation than the photodiode.

* * * * *